United States Patent [19]

Gardiner

[11] Patent Number: 4,512,835
[45] Date of Patent: Apr. 23, 1985

[54] METHOD OF MAKING A CURVED COMPOSITE BEAM

[75] Inventor: Richard J. Gardiner, Murray, Utah

[73] Assignee: Hercules Incorporated, Wilmington, Del.

[21] Appl. No.: 501,737

[22] Filed: Jun. 6, 1983

[51] Int. Cl.³ .................. B65H 81/00; E04C 3/46
[52] U.S. Cl. ........................ 156/174; 52/729;
52/732; 156/175; 156/182; 156/250; 156/300;
264/258; 428/174
[58] Field of Search .............. 156/174, 169, 173, 175,
156/184, 193, 182, 300, 250; 52/729, 732;
264/157, 258; 428/119, 120, 542.8, 174

[56] References Cited

U.S. PATENT DOCUMENTS

| 2,749,266 | 5/1953 | Eldred | 154/90 |
| 3,300,839 | 1/1967 | Lieti | 52/729 |
| 3,795,559 | 3/1974 | Horn et al. | 156/152 |
| 4,020,202 | 4/1977 | Kreft | 428/377 |
| 4,051,289 | 9/1977 | Adamson | 428/378 |
| 4,177,306 | 12/1979 | Schulz et al. | 428/120 |

Primary Examiner—Michael Ball
Attorney, Agent, or Firm—Edmund C. Ross, Jr.

[57] ABSTRACT

A structural composite beam that extends along an arc is disclosed. The beam has a core in which web and flange portions are unitary and made by filament winding. A method is disclosed in which a plurality of these beams are made during a single layup, cure and cutting operation.

1 Claim, 14 Drawing Figures

METHOD OF MAKING A CURVED COMPOSITE BEAM

BACKGROUND OF THE INVENTION

1. Field of Use

This invention relates to curved, structural beams which incorporate filamentary reinforcement and to making these beams using filament winding techniques.

2. Prior Art

U.S. Pat. No. 2,749,266 utilizes filament winding in making beams; the filament wound section of the cured beam has, however, filament extending in a direction parallel to the center line of the beam.

U.S. Pat. No. 3,795,559 shows making a radome in which individual mandrels are wrapped and placed between outer skins comprising filamentary materials.

OBJECTS OF THE INVENTION

It is an object of this invention to provide structural, composite beams that curve lengthwise along an arc.

It is an object of this invention to make these composite beams using filament winding techniques.

It is an object of this invention to provide curved structural composite beams of lighter weight than aluminum beams of comparable dimensions and strength.

These and other objects can be accomplished in accordance with this invention; this will become apparent from the following disclosure.

BRIEF SUMMARY OF THE INVENTION

The curved beam of this invention (a) extends longitudinally along an arc and (b) consists of a plurality of composite elements which contribute to the structural properties of the beam. A first of these composite elements is dissected by a center plane that intersects the beam longitudinally and contains the center of the aforesaid arc. The remainder of the composite elements in the beam lie in curved planes that intersect this center plane at the first composite element.

The core of each beam has a pair of substantially planar web portions that are integrated with each other lengthwise along the beam and constitute the aforesaid first composite element. This core also has one or more flange portions which laterally project from the web and constitute other composite elements of the beam. Each of these flange portions is unitary with either of the web portions in that such web and flange portions together are a portion of a filament wound tube. Each of the aforesaid flange portions carries topically an integral resin and fiber layer, such layer constituting another of the composite elements of the beam. These resin and fiber layers each include continuous filaments which extend along lines parallel to the aforesaid arc of the beam.

In accordance with another aspect of this invention, there is provided a method for manufacture of curved beams wherein each of the beams has a web that extends longitudinally in an arc, and at least one flange which projects laterally from this web. The method features: (a) winding layers of high strength filaments about the exterior surfaces of each of a plurality of mandrels, each of the mandrels having a top surface, side surfaces and a bottom surface, and being curved lengthwise along the intended arc for each beam, the layers of high strength filaments being wet with a curable resin, (b) placing the resin-wet, filament-wound mandrels on a support surface having substantially the same curvature as that of the mandrels, the support surface being covered with a layer of filament-reinforced material, and the filament-wound mandrels being placed in a side-by-side relationship, the side surfaces of the filament-wound mandrels being contiguous with side surfaces of adjacent filament-wound mandrels and the bottom surface of each of the filament-wound mandrels being contiguous with the layer of filament-reinforced material on the support surface, (c) placing a second layer of filament-reinforced material over the top surface defined by the plurality of top surfaces of the filament-wound mandrels, the top surfaces of the filament-wound mandrels being contiguous with the second layer of filament-reinforced material, (d) curing the resulting assemblage comprising the bottom layer of filament-reinforced material, the filament wound mandrels and the top layer of filament-reinforced material, and (e) cutting the resulting composite structure to provide a plurality of curved structural beams, in which each respective web thereof is formed from those portions of filaments of the filament-wound mandrels that were on the contiguous side surfaces of the adjacent filament-wound mandrels.

BRIEF DESCRIPTION OF THE DRAWINGS

FIG. 8 B is an enlarged cross section of the beam in 8 A taken along the line 8 B–8 B.

In FIGS. 2, 7 and 8 B, the elevational view of that portion of the curved beam which would appear in the background has been omitted for simplicity.

DETAILED DESCRIPTION OF PREFERRED EMBODIMENTS OF THE INVENTION

Beams of this invention are composite structures comprising continuous filaments in a hardened resin matrix. Virtually any filament used in reinforcing composite structures can be used alone or in combination in making the beams of this invention. Examples of such filaments include glass, graphite, aramide, boron and carbon filaments. Likewise, any resin which is suitable for composite structures and compatible with the filament used in the making the beams can be used in this invention. Preferably, the resin is thermosetting, such as an epoxy or vinyl ester, resin.

Figure 1:
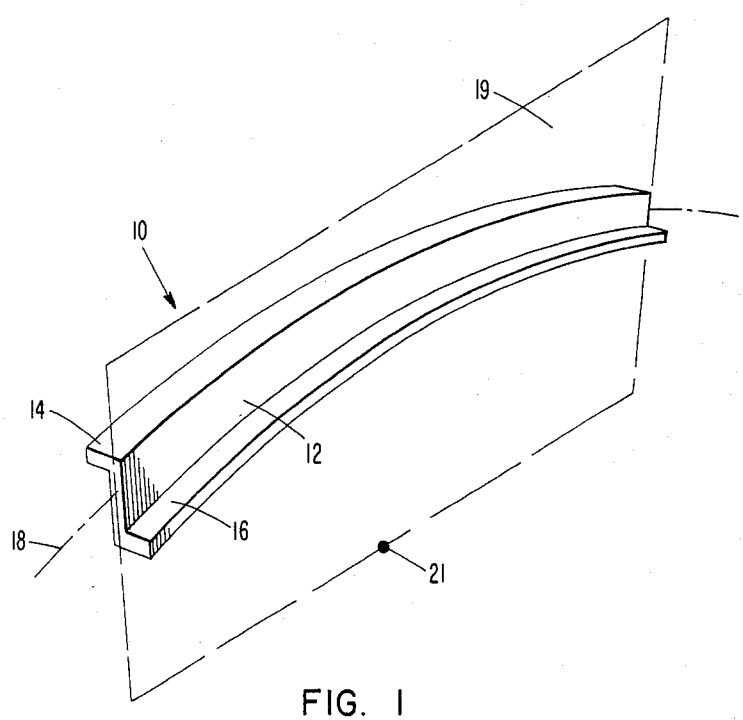
FIG. 1 illustrates in perspective a curved beam made in accordance with this invention.

FIG. 1 illustrates in perspective curved beam 10 of this invention. The curved beam 10 has center line 18 which extends in an arc of any desired radius of curvature. ("Arc" as used herein includes any part of a circle.) Beam 10 has web 12 and flanges 14 and 16, each of which comprises filament in a hardened resin matrix. An imaginery plane, such as plane 19 which extends through web 12 and contains centerline 18, also contains center 21 of the aforesaid arc.

Figure 2:
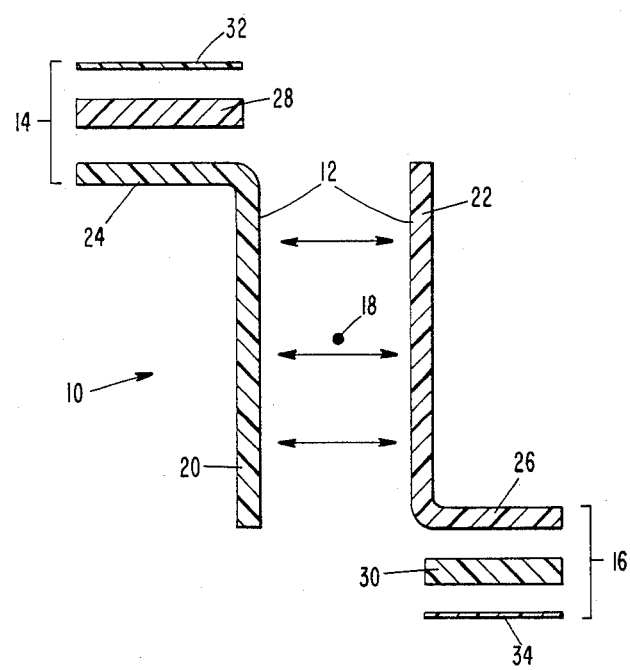
FIG. 2 is a diagramatic cross-section of the beam of FIG. 1. Composite elements of beam 10 integral with each other are depicted as split apart in FIG. 2 for ease of description.

FIG. 2 is a schematic drawing of the beam 10 of FIG. 1. FIG. 2 shows first and second web portions, respectively, 20, 22 which are split apart for clarity of illustration. Web portions 20,22 are actually integral in beam 10 and make up web 12 shown in FIG. 1. The core of beam 10 consists of these web portions 20,22 together with their respective unitary first and second flange portions 24,26. (The term "unitary" is used in describing the combinations: (a) first web and first flange portions 20,24 and (b) second web and second flange portions 22,26, because each of these combinations is filament wound in a separate operation, as discussed hereinafter.)

First and second flange portions 24,26 are respectively integral with first and second flange remainder portions 28,30, although for ease of illustration each of these flange and flange remainder portions are depicted as split apart in FIG. 2. Additional portions of flanges 14,16 are glass cloths 32,34 which respectively are also similarly integral with first and second flange remainder portions 28,30.

First web portion 20 and first flange portion 24 are filament wound as a unit and have, relative to lines parallel to the center line 18 of beam 10, continuous filaments disposed in three resinous layers at angles of about ±45°, 90° and ±45°. Likewise, second web portion 22 and second flange portion 26 are filament wound as a unit and have, relative to lines parallel to the center line 18 of beam 10, continuous filaments disposed in three resinous layers at angles of about ±45°, 90° and ±45°. In other beams of this invention, however, the resin and fiber layers may have filaments which lie at any desired angle relative to center line 18.

Remainder flange portions 28,30 have continuous filaments at an angle, relative to lines parallel to the center line 18, of about 0°. Glass cloth layers 32,34 comprise woven glass such as the glass cloth marketed as glass cloth #120 by Dow Corning.

Figure 3:
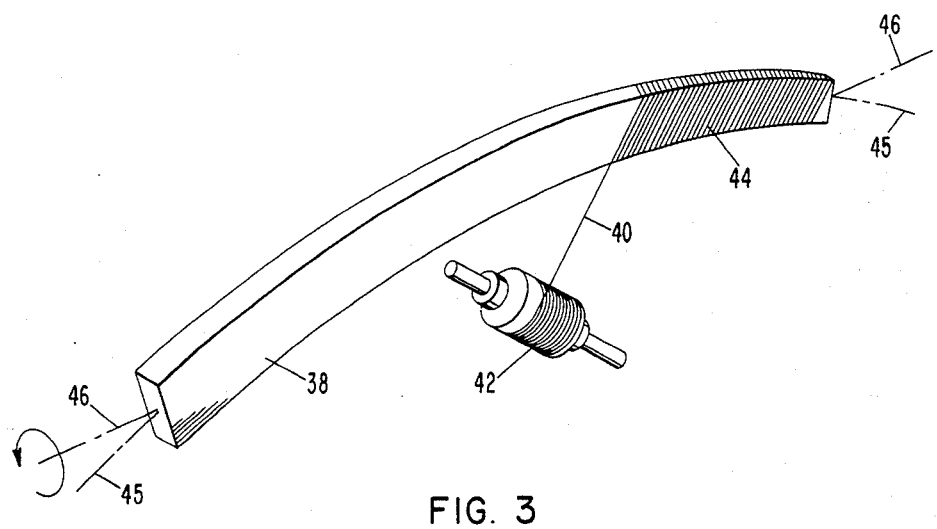
FIG. 3 illustrates the filament winding step in making beams like that of FIG. 1.

FIG. 3 is illustrative of the filament winding step in accordance with this invention. In FIG. 3, curved section 38 serves as a rectilinear mandrel for winding filament 40 from spool 42 and covering mandrel 38 with layers 44 of continuous filaments with predetermined angular depositions, such as discussed above, relative to lines parallel to the mandrel center line 45. Winding axis 46 differs from the center line 45 of mandrel 38 because a conventional filament winding apparatus is used and the filament applicator head is programed to compensate for off axis winding about mandrel 38. Mandrel 38 can be made of metal, plaster, rubber or other such material known in the art.

Figure 4:
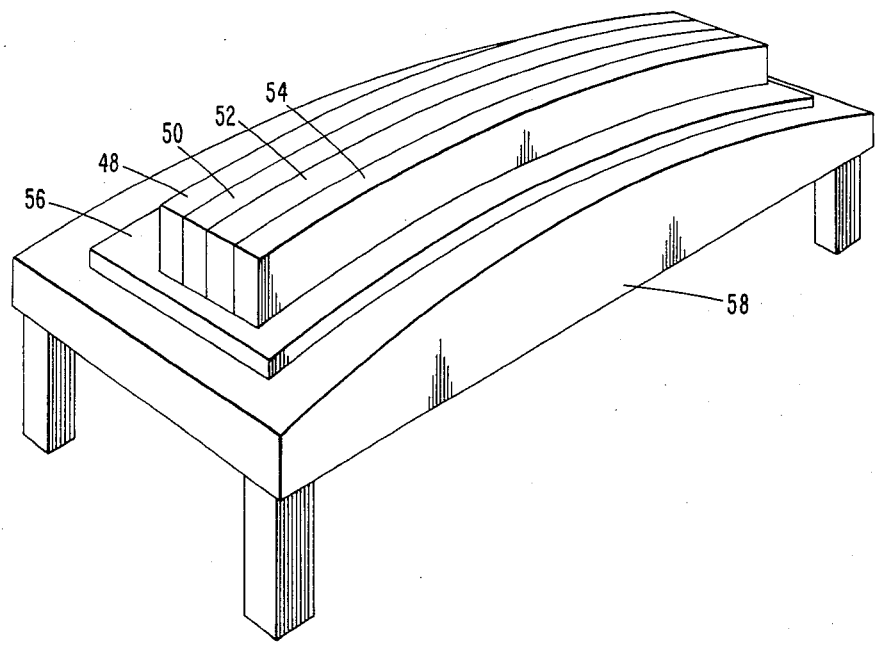
FIG. 4 illustrates laying up of a preform (which is a precursor to the beams of this invention) using filament wound mandrels and spaced prepreg layers.

FIG. 4 depicts laying up of a preform in making the beam of FIG. 1. In FIG. 4, filament wound mandrels 48, 50, 52, and 54 (each wound with three resin and fiber layers as discussed in connection with FIG. 2) have been placed on prepreg sheet 56. Prepreg sheet 56 comprises continuous filaments and is supported by a table having curved surface 58. The curved surface of table 58 has a radius of curvature consistent with the radius of curvature of the finished beams.

Figure 5:
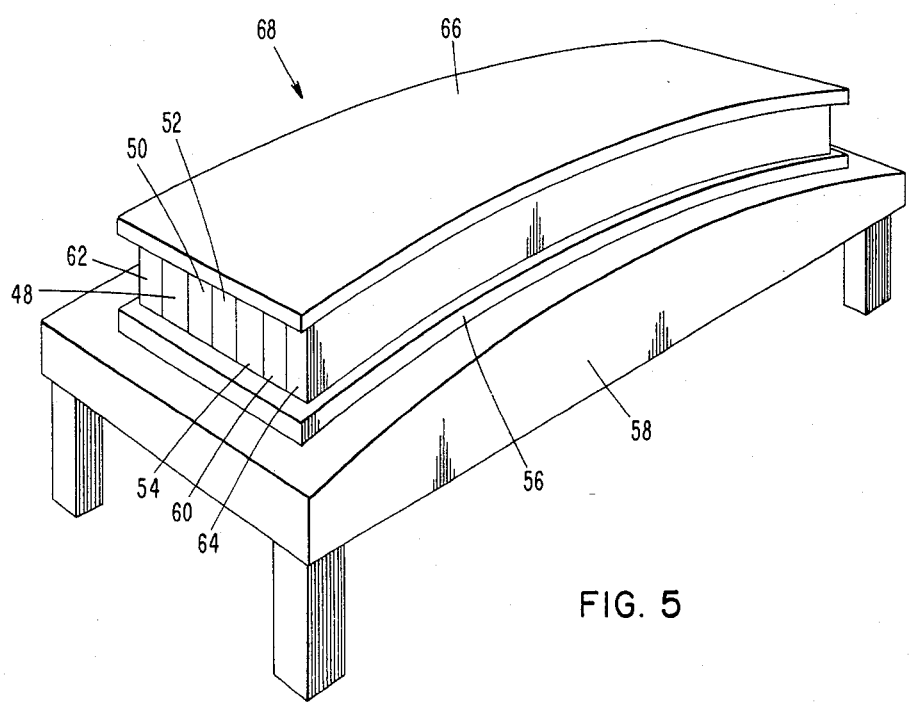
FIG. 5 illustrates a completed lay up which is used in making beams of this invention.

FIG. 5 depicts the completed preform 68 used in making beams of this invention. Preform 68 has filament wound mandrels 48, 50, 52, 54, 60, 62 and 64 side by side with respective side surfaces in contact with each other. Top and bottom surfaces of the assembled filament wound mandrels 48, 50, 52, 54, 60, 62 and 64 contact prepreg sheets 66 and 56, respectively.

Figure 6:
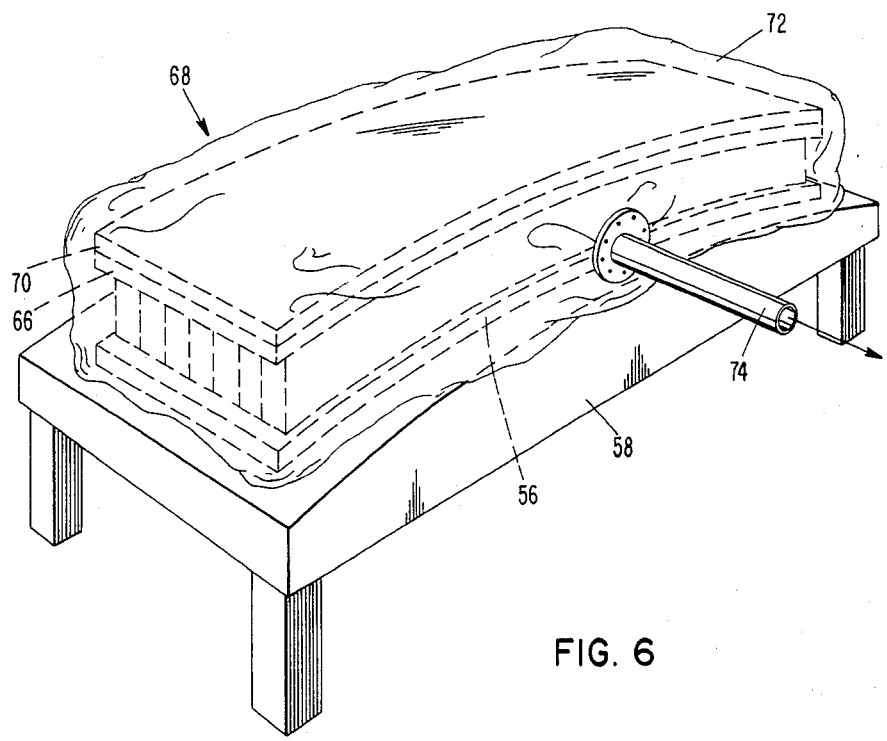
FIG. 6 illustrates vacuum bag staging the lay up shown in FIG. 5.

FIG. 6 shows preform 68 between caul plate 70 and curved table surface 58. Preform 68 is also within vacuum bag 72 which is being evacuated through tube 74. The vacuum bag 72 is used to remove exogenous monomer from the thermosetting resin of preform 68. Hot melt resins (not shown) can be heated, melted and impregnated into the fiber of preform 68 during this vacuum stage. A sheet of the hot melt adhesive can be placed, for example, between caul plate 70 and preform 68 to accomplish this impregnation.

Upon completing the vacuum bag staging of FIG. 6, the preform 68 is autoclaved for precision curing under high pressure.

Figure 7:
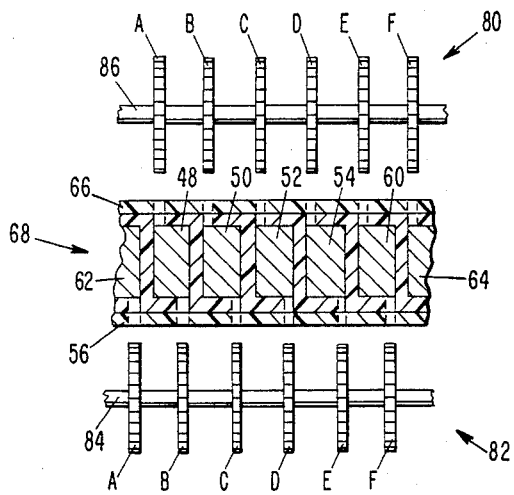
FIG. 7 illustrates cutting of the cured precursor to provide a plurality of beams.

FIG. 7 depicts a cutting operation that can be used in making beams of the cross-section as shown in FIG. 2. Banks 80, 82 respectively comprise a plurality of spaced, diamond blade, circular cutting saws 80A, B, C, D, E, F, and 82 A, B, C, D, E, F, which are, as shown, respectively, rigidly mounted to top and bottom rotating shafts 84, 86. Shafts 84, 86 also move linearly toward each other as well as along the longitudinal curvature of preform 68 in cutting the preform 68 into distinct beams.

FIG. 7 also, by phantom lines, shows the results from the aforedescribed cutting operation. As can be seen from these lines, a plurality of Z-shaped cross-sectional beams result from this cutting operation.

Figure 8A:
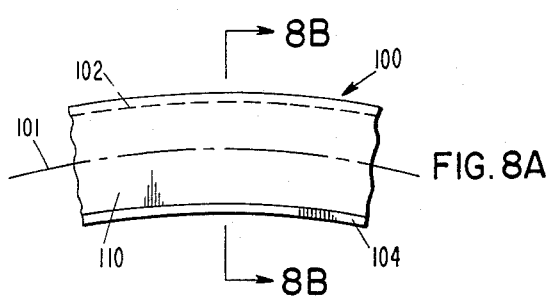
FIGS. 8 A and B illustrate another embodiment of this invention in which the beam has dual flange sections.
Figure 8B:
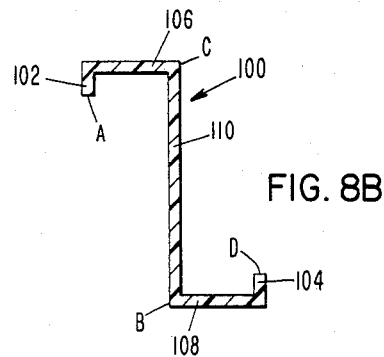
Figure 9A:
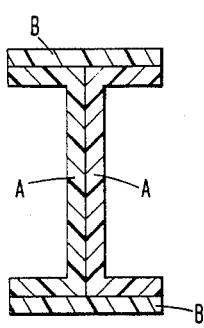
FIG. 9 illustrates cross sections of other curved beam configurations of this invention, shown as 9(A) through 9(E), the respective curved portions of the beams behind the cross sections omitted for simplicity.
Figure 9B:
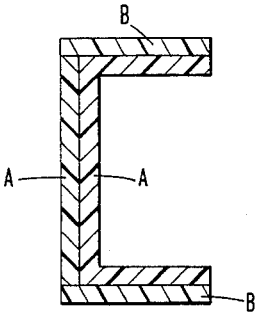
Figure 9C:
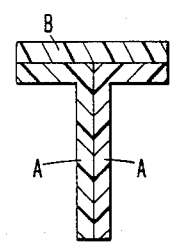
Figure 9D:
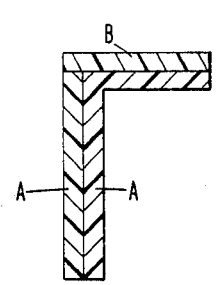
Figure 9E:
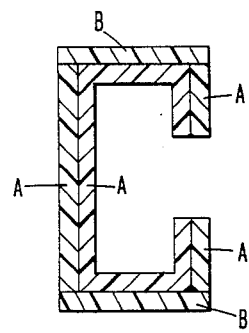

FIGS. 8 A and 8 B illustrate another beam configuration of this invention. Beam 100, as can be seen from FIG. 8 A is curved along its center line 101. As is seen from FIG. 8 B, beam 100 also has small flanges 102, 104 respectively projecting from large flanges 106, 108, which, in turn, project from web 110. Beam 100 is made using a pair of filament wound mandrels positioned side by side and cured between a pair of prepreg sheets as discussed in connection with FIGS. 1–7. Cutting, however, is with diamond blade circular saws at locations A, B, C and D.

It will be understood that beams with a variety of cross-sections can be made in accordance with this invention. Among the many examples of such beams are those illustrated in FIG. 9 where sections designated by the letter "A" are filament wound portions and those designated by "B" are prepreg portions of the beams.

Having described and illustrated preferred embodiments of this invention, it will be understood that the principles hereof can be applied to design and manufacture of beams of still other configurations. Accordingly, this invention is not to be limited to the specifics of the foregoing description, but rather, as in the claims appended hereto.

What is claimed is:

1. A method for manufacture of curved fiber-reinforced composite beams, each of said beams having a web that extends longitudinally in an arc, and at least one flange projecting laterally from said web, said method comprising:
   (a) winding layers of high strength filaments about the exterior surfaces of each of a plurality of mandrels, each of said mandrels having a top surface, side surfaces and a bottom surface, and being curved lengthwise along the intended arc for each said beam, said layers of high strength filaments being wet with a curable resin, (b) placing the resin-wet, filament-wound mandrels on a support surface having substantially the same curvature as that of said mandrels, said support surface being covered with a layer of filament-reinforced material, and said filament-wound mandrels being placed in a side-by-side relationship, the side surfaces of said filament-wound mandrels being contiguous with side surfaces of adjacent filament-wound mandrels and the bottom surface of each mandrel being contiguous with the layer of filament-reinforced material on said support surface, (c) placing a second layer of filament-reinforced material over the top surface defined by the plurality of top surfaces of each of said mandrels, the top surfaces of said mandrels being contiguous with the second layer of filament-reinforced material, (d) curing the resulting assemblage comprising the bottom layer of filament-reinforced material, the filament-wound mandrels and the top layer of filament-reinforced material and (e) cutting the resulting composite structure to provide a plurality of curved structural beams, in which each said web thereof is formed from those portions of filaments of said filament-wound mandrels that were on said contiguous side surfaces of said adjacent filament-wound mandrels.

* * * * *